March 15, 1966 P. DI VITO 3,239,868
FILM CLEANER
Filed Oct. 16, 1963
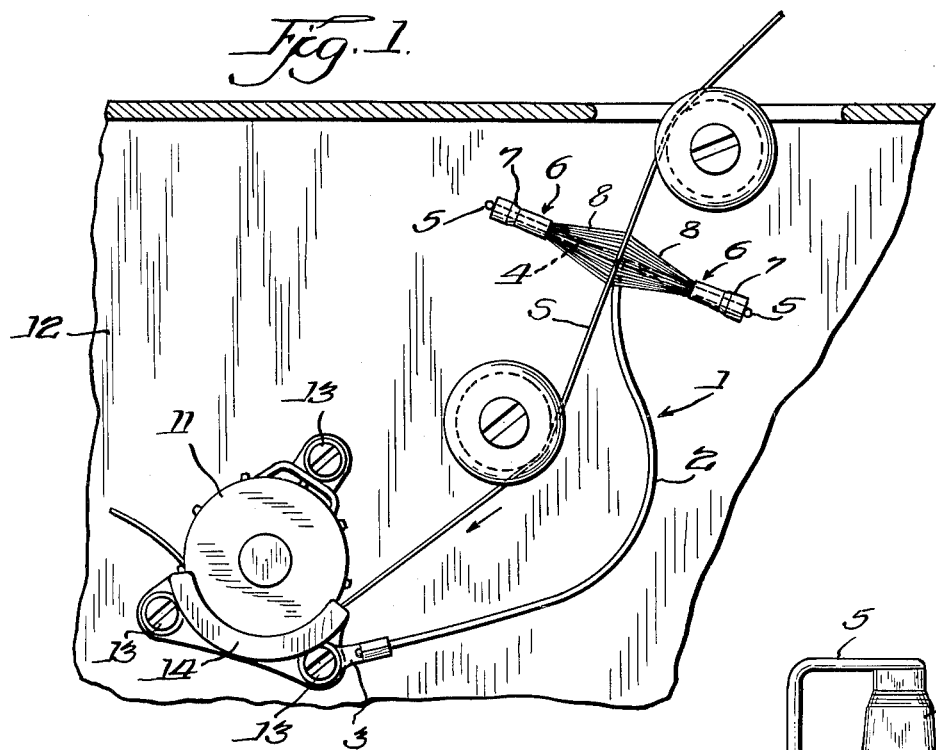
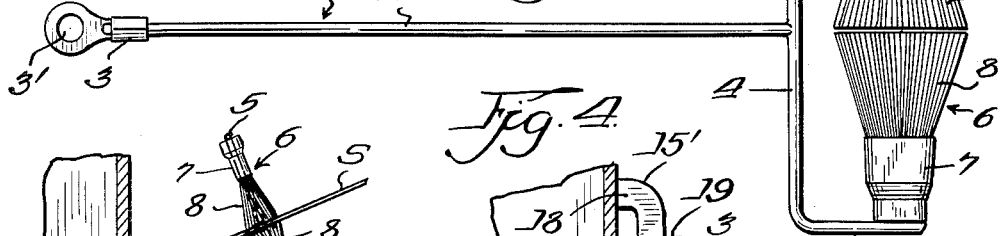
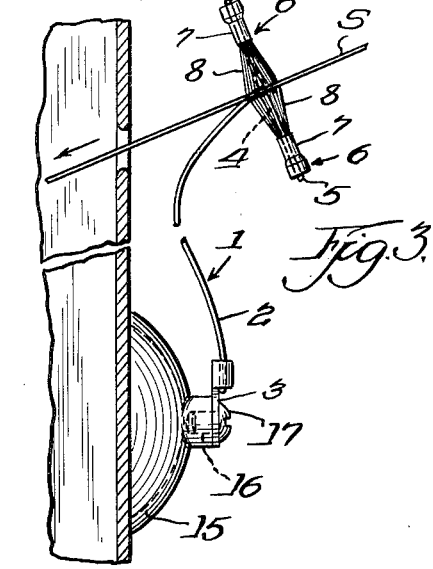
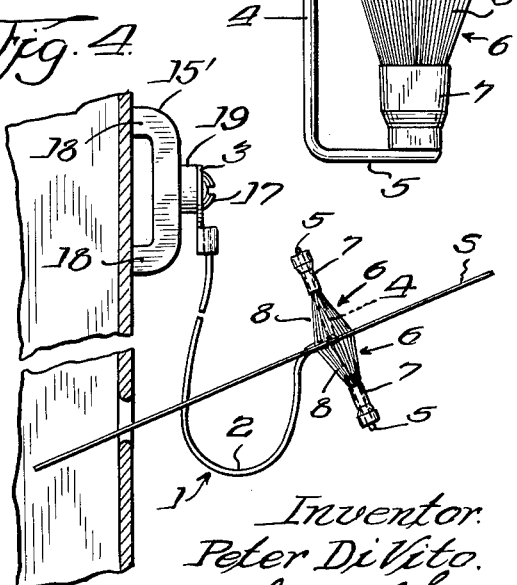
Inventor.
Peter Di Vito.

3,239,868
FILM CLEANER
Peter Di Vito, 2158 W. Foster Ave., Chicago, Ill.
Filed Oct. 16, 1963, Ser. No. 316,737
5 Claims. (Cl. 15—246)

The invention relates generally to apparatus for cleaning movie film, magnetic tape and the like.

The invention is adapted to clean such films in a manner generally somewhat similar to that illustrated in Patent No. 3077625, granted on February 19, 1963, to E. S. Lindau, and may utilize cleaning elements of the same general type as shown in such patent and which generally operate in the same manner as that illustrated in the patented construction.

The present invention has among its objects the production of a film cleaning structure of the type described which is exceedingly simple in construction, inexpensive to manufacture, and substantially universal in application to projectors of substantially any design, eliminating the necessity of numerous specially designed fittings and attachments which might otherwise be necessary to adapt the device to projectors of different makes and models.

A further object of the invention is the production of such device which may be readily formed from wire stock or the like, the characteristics of which are such that the supporting structure may be readily manually bent or deformed to adapt the device to any particular projector and at the same time will in such deformed condition adequately support the film cleaning elements in operative position.

Many other objects and advantages of the construction herein shown and described will be obvious to those skilled in art from the disclosure herein given.

In the drawings, wherein like reference characters indicate like or corresponding parts:

FIG. 1 is a side elevational view of a portion of a projector, illustrating the mounting thereon of a cleaning structure constructed in accordance with the present invention;

FIG. 2 is a plan view of a cleaning device constructed in accordance with the present invention;

FIG. 3 is a side elevational view similar to FIG. 1 of a portion of a projector, illustrating the use of a suction cup adapter to mount the cleaning structure; and FIG. 4 is a side elevational view similar to FIG. 3, illustrating the use of magnetic means for mounting the device on a projector.

The present invention contemplates the use of a very simple structure which may comprise merely a pair of suitable cleaning elements and a supporting structure therefor formed from deformable wire stock or the like, the supporting structure being provided at one end with means for supporting the cleaning elements which are adapted to be disposed at opposite sides of the film to be cleaned, and provided at its opposite end with means for attaching the device to the projector on which it is to be employed. In the embodiment illustrated, the latter end of the supporting structure is provided with a suitable mounting lug or the like adapted to receive a mounting screw forming a part of the projector structure. In the event the design of the projector is such that a suitable mounting screw is not available, the body structure may be provided with a suction cup for use with suitable surfaces of the projector structure or may be provided with magnetic means for attaching the structure to projector structures of suitable metallic construction.

Referring to the drawings and more particularly to FIGS. 1 and 2, the reference numeral 1 indicates generally a film cleaning device constructed in accordance with the present invention comprising an elongated body structure 2, illustrated as being formed from suitable wire stock, having a suitable mounting connection at one end such as a lug member 3 having an eye 3' through which suitable mounting means may be extended. Extending laterally from the elongated portion 2 is a transversely extending cross member 4 rigidly secured to the portion 2 by suitable means, as for example, soldering, welding or the like. The free ends 5 of the cross member 4 are illustrated as being bent to initially extend in the same general direction as the elongated portion 2, and carry at their free ends cleaning elements indicated generally by the numeral 6.

The cleaning elements 6 each comprise a brush having a base portion 7 which may be generally cup-shaped and carries a plurality of very fine hair bristles 8, which may be of a type similar to that presently on the market in the form of small hand film-cleaning brushes. The base portion 7 may be suitably secured to the portions 5 of the body structure by any suitable means, as for example, soldering. While the base portion 7 may be detachably connected to the portions 5, in the event it is desired to employ removable or replaceable cleaning elements, it is believed preferable to permanently fasten the cleaning elements to the body structure and in the event replacement is desired, to replace the entire device.

The body structure 1, including the elongated portion 2 and cross member 4 thereof, is formed of a material such as wire stock, which has sufficient rigidity that it will adequately support the cleaning elements 6 in operative engagement with a film to be cleaned, but has sufficient manual deformability that the operator may readily bend the body structure into any desired configuration to accommodate it to the particular projector on which it is to be mounted.

In many cases the projector will have a screw, for mounting a component part of the projector, available for use in mounting the film cleaner. Thus, referring to FIG. 1, the reference numeral 11 designates a film transport sprocket or the like, which is illustrated as extending from the wall 12 of the projector and cooperable with a bracket 14 secured to the wall 12 by a plurality of screws 13 passing through portions of the bracket. In the illustrated structure of FIG. 1, the film cleaning device 1 is mounted on an adjacent screw 13, the mounting being effected by removal of the screw 13, insertion thereof through the aperture 3' in the lug 3 and replacement of the screw on the projector, thereby firmly attaching the lug 3 and the device to the projector structure. The elongated portion 2 of the body structure is then suitably bent to dispose the cross member 4 preferably under the film strip S, the portions 5 extending upwardly to dispose the cleaning elements 6 at opposite faces of the film strip, with the bristles 8 in engagement therewith. Obviously, the cross member 4, as well as the other portions of the body structure, may be suitably manually bent to dispose the cleaning elements at the most satisfactory positions with respect to the film strip, and to fit the available space on the projector.

As illustrated by the arrow in FIG. 1, the film is preferably movable into the projector and the cleaning device thus is operative prior to the time the film reaches the film gate and associated parts of the projector. The length of the elongated portion 2 preferably is such as to readily accommodate the greatest number of different types of projectors, whereby the structure is substantially universal and it is believed apparent that in the event a greater length is provided than is necessary, the structure may be suitably bent to effectively shorten the body structure. If a considerable length of the elongated portion 2 is unnecessary, a loop may be formed and twisted to effectively shorten such portion, such loop preferably being oriented to lie flat adjacent the side wall or face of the projector.

In some cases the projector may not be provided with a usable mounting screw, in which case an additional adapter may be employed with the structure illustrated in FIG. 2, FIGS. 3 and 4 illustrating the use of suction cup and magnetic adapters.

Thus in FIG. 3, a resilient suction cup 15 is provided having a suitably internally threaded mounting boss 16 thereon adapted to receive a screw 17 by means of which the lug 3 of the cleaning device may be rigidly attached to the suction cup. The suction cop 15 may then be mounted on any suitable surface of the projector, either the external face of the adjacent wall, as illustrated in FIG. 3, or on a side wall such as the wall 12 in the event there is adequate exposed area thereon to accommodate the cup. This construction is particularly adapted for use with inexpensive projectors and the like which employ plastic structures and bases.

FIG. 4 illustrates the use of a magnetic adapter member 15' which is illustrated as being of generally C-shape, having a pair of poles 18 adapted to be engaged with a suitable paramagnetic surface of a projector structure, the adapter 15' being provided with an internally threaded mounting boss 19 or the like adapted to receive the screw 17 by means of which the lug 3 may be rigidly mounted on the adapter. The magnetic adapter 15' may be suitably disposed at a convenient point on the projector to which it is attracted and is operative to rigidly support the cleaning device in operative position with respect to the film.

The cleaning device, including the adapters, may be readily packaged as a complete unit which will thus be applicable to substantially all projectors.

The device may be readily mounted in operative position by unskilled persons and may be readily adjusted for the most suitable operating conditions.

It will also be appreciated that in some cases it may be satisfactory to attach the body structure to a suitable portion of the projector by means of a suitable cement or adhesive.

While, as previously mentioned, the unit could be provided with detachable or replaceable cleaning elements, it is believed that its simplicity and comparative low cost render it practical in most cases to permanently mount the cleaning elements and when they have reached the end of their usefulness the entire unit may be replaced.

Having thus described my invention, it will be obvious to those skilled in the art from the disclosure herein given that the present invention provides, in an extremely simple construction, a substantially completely versatile device which may be readily employed with substantially any type and design of film projector, depending of course upon the size of the cleaning elements, which likewise may be manufactured in a range of sizes to accommodate projectors utilizing films of different width.

What I claim as new and desire to secure by Letters Patent is:

1. A universal film cleaning device for use on projectors of different designs, comprising an elongated body structure, formed from wire-like stock and generally T-shaped, having an elongated mounting portion, a mounting lug to which one end of said mounting portion is rigidly secured, said lug being formed for receiving a screw, by means of which the device may be operatively mounted on a projector adjacent the path of film passing therethrough, the opposite end of said mounting portion carrying a pair of oppositely extending arms which extend transversely to the mounting portion and terminating in free end portions which extend transversely to the associated arm, a cleaning element for each arm, each cleaning element comprising a brush member having a rigid holder for a plurality of fine hair bristles, each brush holder being rigidly connected to the free end portion of its associated arm with the axis of such end portion extending transversely to the direction of said hair bristles, said body structure being formed from a material that may be readily manually bent but has sufficient inherent rigidity that it will operatively support said cleaning elements in adjusted positions at opposite sides of a film strip passing through such a projector, with said fine hair bristles in engagement with respective faces of such a film strip to remove foreign matter therefrom.

2. A film cleaning device as defined in claim 1, comprising in further combination, an intermediate member to which said mounting lug may be rigidly attached, said intermediate member being constructed for relatively rigid connection with a projector structure.

3. A film cleaning device as defined in claim 2, wherein said intermediate member comprises a suction cup having a threaded bore therein for receiving such a screw to mount said lug to said intermediate member.

4. A film cleaning device as defined in claim 2, wherein said intermediate member comprises a permanent magnet having a threaded bore therein for receiving such a screw to mount said lug to said intermediate member.

5. A film cleaning device as defined in claim 2, wherein an available screw forming a part of such a projector is utilized as such a mounting screw.

References Cited by the Examiner

UNITED STATES PATENTS

| | | | |
|---|---|---|---|
| 635,778 | 10/1899 | Hudelson | 15—256.6 X |
| 653,445 | 7/1900 | Garland | 15—256.6 X |
| 1,679,401 | 8/1928 | Broderick | 15—256.6 |
| 2,237,761 | 4/1941 | Leano | 15—160 |
| 2,706,503 | 4/1955 | Zook | 15—77 X |
| 3,044,088 | 7/1962 | Anderson | 15—160 X |

FOREIGN PATENTS 313,769   7/1919   Germany.

CHARLES A. WILLMUTH, *Primary Examiner.*